United States Patent [19]

Nagase et al.

[11] Patent Number: 5,065,645
[45] Date of Patent: Nov. 19, 1991

[54] POWER TRANSMISSION DEVICE

[75] Inventors: Kazuhiko Nagase, Kanazawa; Hideki Nakamura, Fukiagemachi, both of Japan

[73] Assignee: Niigata Converter Co., Ltd., Tokyo, Japan

[21] Appl. No.: 558,102

[22] Filed: Jul. 26, 1990

[51] Int. Cl.[5] .......................................... F16H 47/08
[52] U.S. Cl. ..................................... 74/859; 74/885; 74/733.1
[58] Field of Search ................ 74/730.1, 732.1, 733.1, 74/859, 860, 883, 885, 886, 890

[56] References Cited

U.S. PATENT DOCUMENTS

| | | | |
|---|---|---|---|
| 2,619,848 | 12/1952 | Carnagua | 74/885 X |
| 2,756,616 | 7/1956 | Forster | 74/885 X |
| 2,943,515 | 7/1960 | Isaacson et al. | 74/730.1 |
| 3,817,121 | 6/1974 | Muller-Berner | 74/885 X |
| 4,311,067 | 1/1982 | Froumajou | 74/885 X |

FOREIGN PATENT DOCUMENTS

| | | | |
|---|---|---|---|
| 63-190967 | 8/1988 | Japan | 74/890 |
| 1008538 | 3/1983 | U.S.S.R. | 74/730.1 |

*Primary Examiner*—Allan D. Herrmann
*Assistant Examiner*—William O. Trousdell
*Attorney, Agent, or Firm*—Amster, Rothstein & Ebenstein

[57] ABSTRACT

A power transmission device, in particular for a Diesel motor car is disclosed which comprises a hydraulic transmission and a mechanical transmission connected in series, the latter having low- and high-speed clutches, where in place of a direct drive clutch comprising a mechanical clutch that has hitherto been provided at the input side of the hydraulic transmission low- and high-speed clutches each comprising a mechanical clutch are provided in the mechanical transmission so as to serve as a direct drive clutch, remarkably shortening the time necessary for engaging the low- and high-speed clutch e.g. when the car is coasting with the low- and high-speed clutches disengaged.

3 Claims, 2 Drawing Sheets

POWER TRANSMISSION DEVICE

FIELD OF THE INVENTION

The present invention relates to a power transmission device, and more particularly to a transmission for Diesel motor car having a mechanically engaging clutch.

DESCRIPTION OF THE PRIOR ART

In a Diesel motor car for example (hereinafter referred to as "a car"), between the output shaft of the Diesel engine (hereinafter referred as "an engine") and the axle of the car a power transmission device or a transmission gear comprising a torque converter and a transmission is generally provided and it is used to transmit the output torque of the engine to the transmission through the torque converter during hydraulic drive operation when the car is starting off so that the large amount of torque necessary for the initial movement of the car is obtainable without the need for changing gear ratios by transmitting the output torque to the axle through the transmission. Thus the car is effectively accelerated at the time of starting off, but once the car has reached high speed the output torque required decreases, the power transmission route of the engine output through the torque converter is cut out, and the output torque from the engine is directly transmitted to the transmission.

Hitherto, the switching from a hydraulic drive operation during the car's initial movement operation to a direct drive operation has been carried out by switching between the engagement or disengagement of the hydraulic drive clutch and the direct drive clutch provided at the input side of the torque converter. Further, this direct drive at a low speed stage range is then switched to a direct drive at a high speed stage range, the car being gradually accelerated. Now, in reference to the attached drawings, FIG. 2 is an example of a conventional power transmission device of this type, i.e. one wherein a mechanically engaging clutch is used as a direct drive clutch will be explained.

As shown in the drawing, as well-known in the art this mechanical clutch comprises a direct drive clutch 1, a torque converter 5, a hydraulic drive clutch 20 and a transmission 30, connected in series.

First, the direct drive clutch 1 comprises an input shaft 4 connected to the flywheel (not shown) of a Diesel engine, i.e. engine 2, through a coupling 3, a cylindrical shaft 7 integrally connecting the cover wheel 6 of the torque converter 5, and an inner cylindrical member $7_0$ axially shiftably disposed within a gap formed between the cylindrical shaft 7 and the hollow turbine shaft $6_0$ at the output side of the torque converter 5, whereby on the inner and outer peripheries of the inner cylindrical member $7_0$ inner and outer splines 8 and 9, are formed respectively, the outer spline 9 being always in mesh with the spline teeth 10 formed on the inner periphery of the cylindrical shaft 7, whereas the inner spline 8 is able to mesh with the spline teeth 11 formed on the outer periphery of the hollow turbine shaft $6_0$ at the output side of the torque converter 5. The inner cylindrical member $7_0$ constituting the direct drive clutch 1 is connected to an outer cylindrical member 14 arranged on the outer periphery of the cylindrical shaft 7 to be concentric with the inner cylindrical member $7_0$ through a pin 16 which is axially shiftable within a slot 15 formed in the axial direction of the cylindrical shaft 7. The outer cylindrical member 14 has a peripheral groove 17 formed on its outer periphery with which a fork 18 meshes so as to be shiftable in the peripheral direction, the fork 18 being shiftable by a pneumatic cylinder 19 mounted to the casing of the power transmission device. Thus, when the pneumatic cylinder 19 is actuated the fork 18 can be axially moved so that the inner cylindrical member $7_0$ is also axially moved through by pin 16 together with the outer cylindrical member 14.

Next, the hydraulic drive clutch 20, in order to make it possible for the cover wheel 6 of the torque converter 5 to engage or disengage from the impeller wheel 21, input side clutch plates 22 splined to the inner periphery of the cover wheel 6 are provided so as to be axially shiftable as well as output side clutch plates 24 splined to the boss 23 integral with the impeller wheel 21 so as to be axially shiftable, whereby the input side clutch plates 22 and the output side clutch plates 24 are alternatively arranged so that when the hydraulically operable annular piston 25 mounted in the cover wheel 6 is actuated the clutch plates 22, 24 are caused to be pushed toward each other.

Thus, the power from the engine 2 is transmitted from the hollow turbine shaft $6_0$ to the turbine shaft 27 by a spline 26 after being switched between going through either the direct drive clutch 1 or the torque converter 5. The turbine shaft 27 is connected to the input shaft $30_0$ of the transmission 30 through a coupling 28, the input shaft $30_0$ rotatably supporting a reverse low-speed drive gear 31 and high-speed drive gear 32. Further, mechanical clutches 41 and 42 are provided to selectively transmit the rotation of the input shaft $30_0$ to the low-speed drive gear 31 or the high-speed drive gear 32, The mechanical clutches 41 and 42 comprises a shift member 36 splined to the input shaft $30_0$ and adapted to be axially shiftable through the fork 33 by the pneumatic cylinders 34 and 35, inner splines 37 and 38 formed inside the shift member 36, and outer splines 39 and 40 formed integrally with the low-speed drive gear 31 and high-speed drive gear 32, respectively, so as to be able to be engaged with the inner splines 37 and 38, respectively.

Thus, when the shift member 36 is axially shifted through the fork 33 the inner spline 37 or 38 may be selectively meshed with either the outer spline 39 or 40, respectively, formed on the drive gear 31 or 32. The input shaft $30_0$ is provided with a gear 43 integral therewith, and a forward rotation shaft 45 having a gear 44 in mesh with the gear 43 is provided, the forward rotation shaft 45 rotatably supporting a forward rotation low-speed drive gear 46 and high-speed drive gear 47. The gears 46 and 47 have constitutions similar to the reverse rotation drive gears 31 and 32, and are provided with mechanical clutches 50 and 51, respectively, adapted to be selectively engaged with the forward rotation low-speed drive gear 46 or high-speed drive gear 47 by the operation of a pneumatic cylinder 48 or 49, respectively.

The forward or reverse rotation low-speed drive gears 46 and 31, respectively, are each in mesh with a low-speed output gear 53 integral with an output shaft 52, while the high-speed drive gears 47 and 32 are respectively each in mesh with a high-speed output gear 54. The output of the engine 2 is adapted to be transmitted from the output shaft 52 through bevel gears not shown to the axle of the car.

As will be apparent, the power transmission device described above, has the advantages that owing to the adoption of mechanical clutches for all of the clutches except the variable hydraulic drive 20, it is possible to obviate the frictional loss found in the case of hydraulic clutches resulting from the slipping between clutch plates 22, 24 at the time of engaging or disengaging of the hydraulic drive clutch 20, and since no high hydraulic pressure for actuation of the hydraulic clutch is necessary, the power of a hydraulic pump is reduced, improving efficiency.

On the other hand, the reason why as a hydraulic drive clutch 20 a mechanical clutch is not adopted resides in that during the running of the car, in the case of switching over from a neutral state or a direct drive state to a hydraulic drive state it is difficult to match the rotational speeds between the following members, i.e. input side of the torque converter 5 to which the rotation of the engine is directly given, and the impeller wheel 21 the rotation speed of which is in an unstable state due to the effect of the rotation of the turbine wheel 55 which is rotated from the side of the transmission 30 and the stator 58 rotatably supported in one direction to the housing 56 through a free wheel 57, but, when a hydraulic clutch is adopted as the hydraulic drive clutch 20, even if there is a difference in the rotational speeds between the cover wheel 6 and the impeller wheel 21 the clutch plates 22, 24 can smoothly engage with each other while slipping.

In general, since the torque converter is only used during hydraulic drive running the car is starting off the time during which the hydraulic drive clutch is used is short. Therefore, there is another advantage in that the operating time of the hydraulic pump which delivers high pressure clutch fluid is short.

Further, in this power transmission device, the direct drive clutch 1 and the clutches 41, 42, 50 and 51 of the transmission 30 are all composed of mechanical clutches, and the engaging of these clutches is carried out in such a manner that the rotation speeds of the engine 2 and the output shaft 52 of the transmission 30 are detected by an engine rotation speed detector 59 and an output shaft rotation speed detector 61, respectively, to deliver the detected signals from the respective detectors 59 and 61 to a controller 63, the rotation speeds are compared in the controller 63, the controller 63 then issuing a signal to control an electronic governor 64 of the engine so as to synchronize the rotation speeds of the input side and output side, and at the time of their synchronization delivers engaging signals to clutch switching solenoids.

However, as described above, since the conventional power transmission device, has a direct drive clutch 1 as the mechanical clutch in addition to the hydraulic drive clutch 20, some inconveniences arise when the range clutch to select a low- or high-speed is switched over while the car is coasting during which both the clutches 1 and 20 are disengaged. For example, assuming that in order to recover the decrease in speed of the car the high-speed condition is switched over to a low-speed condition. In this case, the following procedure is taken. That is, after the direct drive clutch 1 which has been in a disengaged state is engaged the high-speed clutch 42 is disengaged, to be followed by the engagement of the low-speed clutch 41. However, in order to engage the direct drive clutch 1 the detected engine rotation speed signal 60 from the engine rotation speed detector 59 and the detected output rotation speed signal 62 from the output rotation speed detector 61 are delivered to the controller 63 together with a direct drive command signal, a signal 65 being delivered to the electronic governor 64 to manipulate the throttle lever of the engine 2 so that the rotation speeds of the input and output sides of the direct drive clutch 1 are synchronized, adjusting the output rotation speed of the engine 2. As a result, when their rotation speeds are synchronized an energizing signal 67 is delivered to the solenoid of a solenoid valve 66 which supplies air pressure from a pressurized air source to the direct drive clutch 1 so as to engage it. Thereafter, when a command signal is delivered to the controller 63 to switch over from a high-speed stage to a low-speed stage, similar to the above case, the controller 63 receives the detected rotation speed signals 60 and 62, the controller 63 issuing a signal 69 to dienergize the solenoid of the solenoid valve 68 which supplies the pressurized air to the pneumatic cylinder 35 of the high-speed clutch 42, resulting in disengagement of the high-speed clutch 42. Simultaneously the controller 63 delivers a signal 65 to the electronic governor 64 so that the rotation speeds of the input and output sides of the low-speed clutch 41 are synchronized. And, at the time of the synchronization of the rotation speeds an energizing signal 71 is delivered to the, solenoid of the solenoid valve 70 to operate the pneumatic cylinder 34 of the low-speed clutch 41, it being engaged, to complete the switching.

Thus, in the conventional power transmission device, since the operation for the synchronization of the switching over of the clutches is carried out in two stages there arises a problem that it takes too much time to complete the switching.

SUMMARY OF THE INVENTION

Therefore, it is one of the objects of the present invention to provide an improved power transmission device, in particular a transmission device for Diesel cars provided with mechanical clutches which allows the switching over from a high-speed stage to low-speed stages or vice versa by a single step operation, contrary to the two step operation in the conventional power transmission device.

In accordance with the present invention a power transmission device is provided wherein an input shaft directly connected to an engine is directly coupled to a low-speed drive gear and a high-speed drive gear of a transmission through mechanical clutches, respectively, the input shaft being connected to a torque converter through a hydraulic drive clutch as a fluid-type friction clutch which is coaxially mounted on the input shaft, the output side of the torque converter being directly connected to the low-speed drive gear through a free wheel.

Thus, in the power transmission device in accordance with the present invention the low- and high-speed clutches serve the same purpose as a direct drive clutch in the conventional power transmission device. That is, the low-speed drive gear is adapted to switch between and transmit the hydraulic drive rotation from torque converter through the free wheel or the direct rotation through the low-speed clutch. The high-speed clutch is provided opposite the low-speed clutch so as to be coaxial therewith, and they are both constituted so that when one of them is in an engaged position the other is in a disengaged position, whereas in a position intermediate the above two positions they are placed in neutral.

Thus, in the present invention, since the high-speed drive gear is not connected to the torque converter it is not possible to be operated under a hydraulic drive condition while operating at high speed, but, since large output torque as required during initial movement of a car is given by the low-speed drive gear, the high-speed drive gear usually not being required, only a direct drive is made possible for the sake of simplifying the constitution.

Further, in the present invention, in order to enable the power transmission by the low- and high-speed drive gears in both forward and reverse operations a mechanically engaging clutch having a forward rotation gear and a reverse rotation gear meshing with each other is provided between the drive gears and the output shaft.

Thus, in the present invention, since the low- and high-speed clutches serve as the direct drive clutch which is provided separately in conventional power transmission devices the need for the direct drive clutch engaging operation between high- and low-speed operation required in the conventional device is eliminated the switching can be completed by a single stage operation, reducing switching time, and making rapid switching possible.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENT

Figure 1:
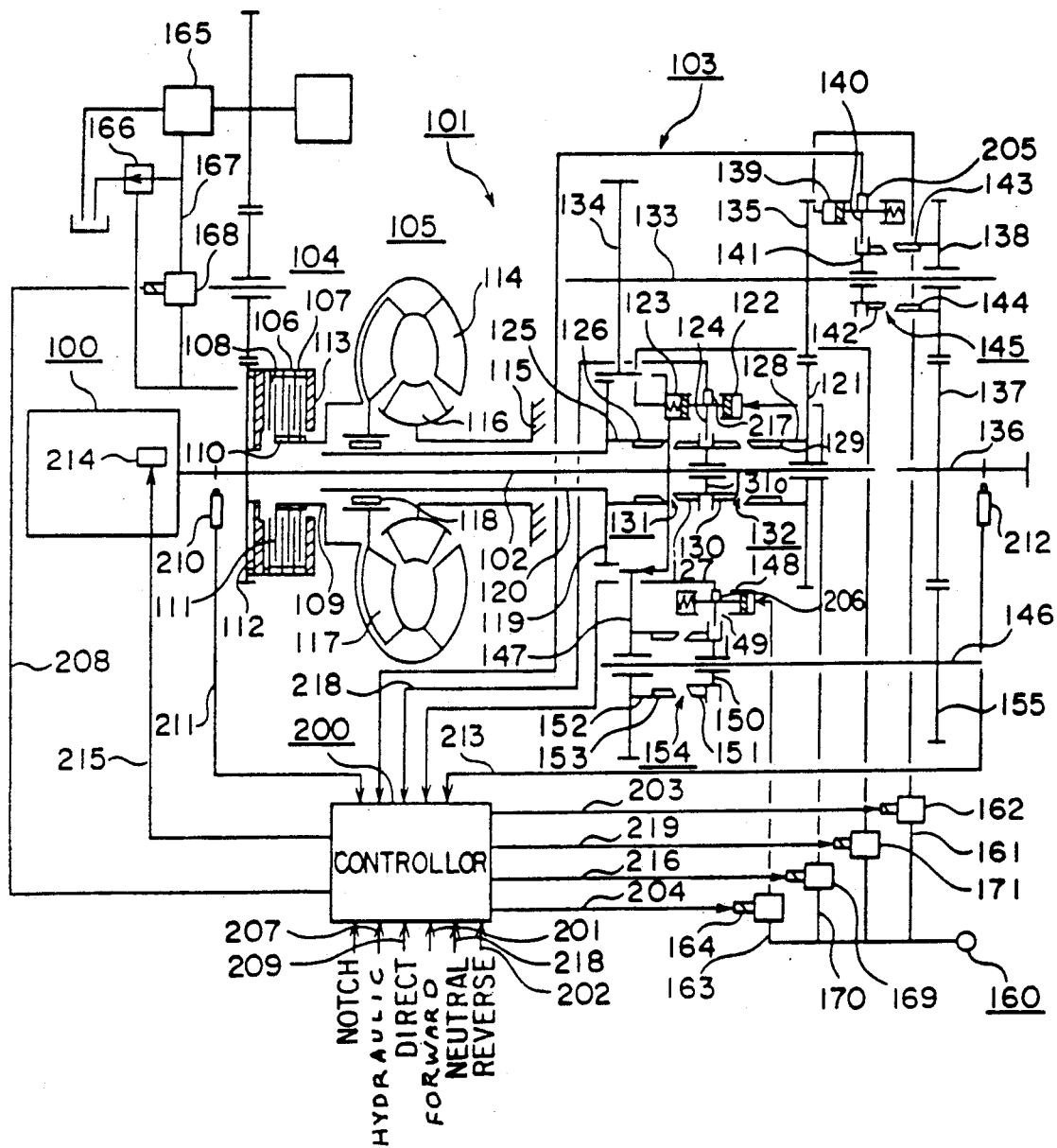
FIG. 1 is a schematic view showing the whole arrangement of one embodiment of the power transmission device in accordance with the present invention.
Figure 2:
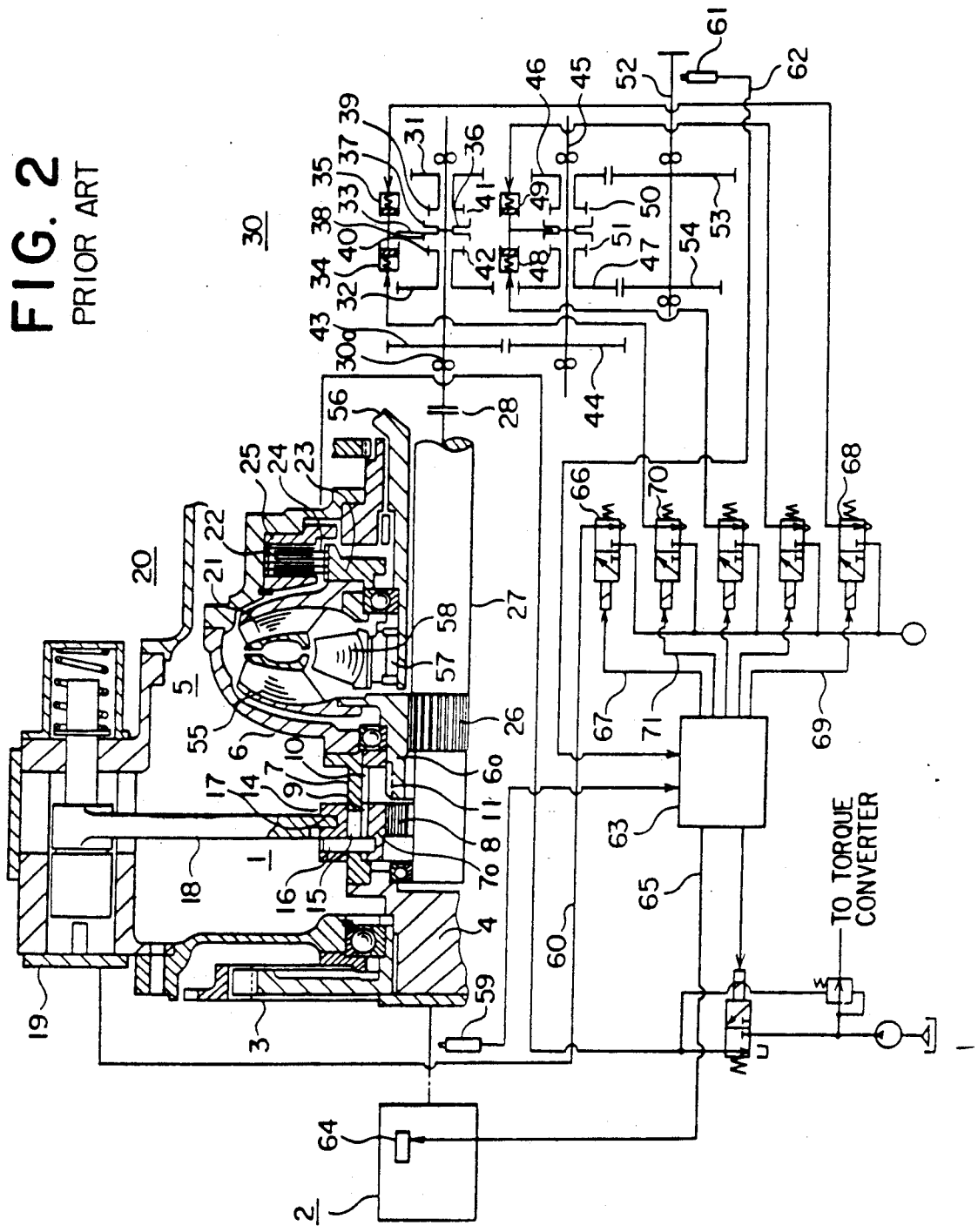
FIG. 2 is similar view showing a conventional power transmission device.

Referring now to FIG. 1 of the drawings, the power transmission device in accordance with the present invention comprises a hydraulic transmission 101 and a transmission 103. First, a Diesel engine 100 as the power source is connected to the input shaft 102 of the hydraulic transmission 101 at its input side through a flywheel and an elastic coupling (both being not shown), the input shaft 102 being directly connected to the transmission 103 at its input side. Coaxially arranged on the input shaft 102 are a hydraulic-type friction clutch 104 and a torque converter 105, whereby the input side clutch plates 108 mounted to be axially shiftable on a spline 107 formed on the inner periphery of a clutch carrier 106 at the input side of the hydraulic type friction clutch 104 and output side clutch plates 111 mounted to be axially shiftable on the spline 110 of a hollow shaft 109 at the output side are alternatively shiftable within an annular groove provided in the clutch carrier 106 and a backing plate 113 integral with the clutch carrier 106. Thus, when the clutch plates 108 and 111 are engaged by actuation of clutch piston 112 the rotation of the engine 100 is transmitted to the impeller wheel 114 of the torque converter 105. With the pumping operation caused by the rotation of the impeller wheel 114 a circulating flow is generated within the fluid circuit of the torque converter 105, the circulating flow having its flow direction deflected by the stator 116 fixed to the housing 115, and the circulating flow impinging upon the turbine wheel 117 to rotate it so that increased torque is transmitted through the free wheel 118 to a cylindrical shaft 120 integral with a low-speed drive gear 119 of the transmission 103. The input shaft 102 directly connected to the engine 100 passes through the cylindrical shaft 120 to project into the transmission 103, the input shaft 102 rotatably supporting a high-speed drive gear 121 which is coaxially arranged so as to be opposite the low-speed drive gear 119. In order to switch over between these low- and high-speed drive gears 119 and 121 low- and high-speed clutches 131 and 132 are respectively provided as mechanical clutches which have a shifting member $131_0$ that is adapted to be axially shiftable on the input shaft 102 through a shift lever 124 by pneumatic cylinders 122 and 123, and that is provided with an outer spline 127 adapted to engage with or disengage from the inner spline 126 formed around the hub 125 of the low-speed drive gear 119 as well as an outer spline 130 adapted to engage with or disengage from the inner spline 129 formed around the hub 128 of the high-speed drive gear 121.

The low- and high-speed drive gears 119 and 121 mesh with a low- and high-speed driven gears 134 and 135, respectively, each integral with an intermediate shaft 133 on which a forward rotation gear 138 is rotatably supported. A forward rotation clutch 145 is provided which has a shift member 141 that is axially shiftable on the intermediate shaft 133 through a shift lever 140 by a pneumatic cylinder 139, an outer spline 142 of the shift member 141 being adapted to engage with or disengage from an inner spline 144 formed around the hub 143 integral with the forward rotation gear 138.

The low-speed drive gear 134 also meshes with a reverse rotation gear 147 rotatably supported on a reverse rotation shaft 146. On the reverse rotation shaft 146 is a shiftable member 150 constituting a reverse clutch 154 supported to be axially shiftable, and an outer spline 151 formed on the shiftable member 150 being adapted to engage with or disengage from an inner spline 153 formed around the hub 152 integral with the reverse rotation gear 147. Integrally mounted on the reverse rotation shaft 146 is a gear 155 for meshing with the output gear 137.

Next, the operation of the power transmission device having a constitution as stated above will be explained below.

First, at the time of starting off, in order to engage either the forward rotation clutch 145 or the reverse rotation clutch 154 in accordance with the running direction of the car a forward or reverse operation command signal 201 or 202 is selectively delivered to a controller 200. In the former case, the controller 200 issues a signal 203 to energize a solenoid of a forward operation solenoid valve 162 provided in the pipe line 161 from the pressurized air source 160 to the pneumatic cylinder 139 of the forward rotation clutch 145, and in the latter case the controller 200 issues a signal 204 to energize a solenoid of a reverse operation solenoid valve valve 164 provided in the pipe line 163 from the pressurized air source 160 to the pneumatic cylinder 148 of the reverse rotation clutch 154, engaging the forward rotation clutch 145 or the reverse rotation clutch 154. The forward rotation and reverse rotation clutches 145 and 154 are provided with a forward shift detector 205 and reverse shift detector 206, respectively, and after a shift detecting signal is issued from either one of the detectors 205 or 206 to be delivered to the controller 200 the driving control begins.

Succeedingly, in order to begin hydraulic drive operation at a low speed, when a hydraulic drive command signal 207 to engage the hydraulic-type friction clutch 104 is given simultaneously with the starting of the engine 100, a signal 208 is output from controller 200 to energize a solenoid of a hydraulic drive solenoid valve 168 provided in the pipe line 167 to supply hydraulic pressure to the clutch piston 112 of the hydraulic-type friction clutch 104 from the hydraulic pump 165 through a pressure regulating valve 166, the hydraulic-type friction clutch 104 thereby being engaged to deliver the power of the engine 100 to the cylindrical shaft 120 through the hydraulic-type friction clutch 104 and the torque converter 105, and is delivered from the low-speed drive gear 119 integral with the hollow shaft 120 to the low-speed driven gear 134 in mesh therewith. And, when the forward operation clutch 145 is engaged forward operation power is delivered from the intermediate shaft 133 to the output shaft 136 through the forward rotation clutch 145, forward rotation gear 138 and output gear 137, while, when the reverse rotation clutch 154 is engaged, a reverse operation power is delivered from the low-speed driven gear 134 to the output shaft 136 through the reverse rotation gear 147, reverse rotation clutch 154, reverse rotation shaft 146, gear 155 and the output gear 137.

When sufficient car speed is attained under the hydraulic drive operation by the torque converter 105, in order to switch over from the hydraulic drive operation to a direct drive operation, first a direct operation command signal 209 to engage the low-speed clutch 131 is given through the controller 200. Then the controller 200 receives the detected engine rotation speed signal 211 from an engine rotational speed detector 210 and the detected output rotation signal 213 from the output rotation detector 212, the controller 200 comparing and calculating these detected signals 211 and 213, and issues a control signal 215 to an electronic governor 214 to manipulate the throttle lever of the engine 100 so that the rotation speeds at the input and output sides of the low-speed clutch 131 are synchronized. Thus, if the rotation speeds of the input and output sides are synchronized a signal 216 to engage the low-speed clutch 131 is issued to a solenoid of a low speed solenoid valve 169, air under pressure being delivered through the pipe line 170 from the pressurized air source 160 to the low-speed pneumatic cylinder 122, and the low-speed clutch 131 is engaged. When a range shift detector 217 to detect the shifting of a low-speed, neutral and high-speed state issues a shift signal 218 confirming the engagement of the low-speed clutch 131 to the controller 200, the controller issues a signal 215 to the electronic governor 214 to increase the output of the engine, 100, switching over the operation from the hydraulic drive operation to a direct drive operation.

Thus, when the operation is switched over to the direct drive the free wheel 118 idles so that loss due to agitation of the fluid in the torque converter 105 is avoided.

Under the high-speed direct operation, when the car speed increases sufficiently and reaches a predeterminded output rotation speed the controller 200 receives an output signal 213 from the output rotation speed detector 212, shutting off the energizing signal 216 to the solenoid of the low-speed solenoid valve 169 to disengage the low-speed clutch 131. And, when a shift signal 218 is given to the controller 200 from the range shift detector 217 indicating the disengagement of the low-speed clutch 131 and that it is in a neutral state the controller 200 controls the electronic governor 214 so as to synchronize the rotation speeds of the input and output sides of the high-speed clutch 132. When these rotation speeds are synchronized the controller 200 issues an energizing, signal 219 to the solenoid of the high-speed solenoid valve 171 to supply air pressure to the high-speed pneumatic cylinder 123 so that the high-speed clutch 132 engages. And, when the range shift detector 217 issues a shift signal 218 confirming the engagement of the high-speed clutch 132 to the controller 200, the controller issues a signal 215 to the electronic governor 214 so as to increase the output of the engine 100, switching over from the low speed to a high speed, and car speed gradually increases.

Thus, when car speed reaches a desired high speed the energizing signal 219 is shut off to disengage the high-speed clutch 132. When the range shift detector 217 confirms the disengagement of the clutch 132 and a neutral shift command signal 218 is given to the controller 200 it issues a signal 215 to the electronic governor 214 to decrease the rotation speed of the engine 100, the car coasting.

In the above, although the operation of a car from its start to a high speed operation under the use of the power transmission device was explained in accordance with the present invention. The following is a brief explanation of the control for the operation of the car from coasting to powered operation.

That is, when a speed lever is raised a notch in order to switch over to powered operation the controller 200 receives a detected signal 213 from the output rotation speed detector 212, the controller 200 issuing an engaging command to the clutch corresponding to the car speed so as to engage the low-speed clutch 131 or high-speed clutch 132 so that synchronization control is carried out in a similar manner as in the above case.

Although in the above example it is assumed that a spline-type clutch is used as a mechanically engaging clutch it will be appreciated that a power transmission device having a constitution and operation similar to the above exemplified device can be provided even if a claw-type clutch in which engagement teeth are provided radially is used in place of the spline-type clutch.

Many changes and modifications of the invention illustrated in the drawing will of course be possible. Accordingly, the scope of the invention tends to be limited only by the scope of the appended claims.

What is claimed is:

1. A power transmission device suitable for use in a rail car and so providing coasting operation and the same speed ratios and the same speed change steps in both forward and rearward powered operations, wherein the output of an engine is selectively transmitted to a transmission either indirectly through a torque converter or directly by bypassing said torque converter, the output being then transmitted to an output shaft through said transmission with the rotational speed being varied, characterized in that the input shaft connected to the output shaft of said engine can be selectively connected to a low-speed drive gear or a high-speed drive gear of said transmission through a low-speed clutch or a high-speed clutch, respectively, each comprising a mechanically engaging clutch, and in that a cylindrical shaft secured to said low-seed drive gear is arranged coaxially with said input shaft, said cylindrical shaft being connected to an output side of said torque converter through a free wheel, and in that an impeller wheel at the input side of said torque converter can be connected to said input shaft through a hydraulic friction clutch.

2. A power transmission device as claimed in claim 1, wherein an engine rotational speed detector (210) is provided at the output side of said engine (100) and an output rotational speed detector (212) is provided at the output side of said transmission (103), a shift detector (217) being mounted to said low-speed clutch (131) and high-speed clutch (132), and a controller (200) is provided to receive detected signals (211, 213) from said engine rotational speed detector (210) and said output rotational speed detector (212) as well as a detected shift signal (218) from said shift detector (217), said controller (200) issuing a signal (215) to an electronic governor (214) cooperating with a throttle lever of said engine (100) on the basis of said detected signals (211, 213, 216), and when said controller (200) confirms synchronization of the rotational speeds at said input and output sides of said low-speed clutch (131) or said high-speed clutch (132) it issues a signal (216, 219) to switch over a switching valve (169, 171) for said low-speed clutch (131) or high-speed clutch (132).

3. A power transmission device as claimed in claim 1, wherein said transmission contains an intermediate shaft, said output shaft coaxial with said input shaft and a reverse rotation shaft, said intermediate shaft integrally mounting a low-speed driven gear and a high-speed driven gear, each adapted to engage with said low-speed drive gear and said high-speed drive gear, respectively, as well as rotatably mounting a forward rotation gear, whereby said output shaft integrally mounts an output gear in mesh with said forward rotation gear, and said intermediate shaft is provided with a forward rotation clutch as a mechanical clutch to engage said forward rotation gear with or disengage it from said intermediate shaft, and said reverse rotating shaft rotatably mounting a reverse gear adapted to mesh with said low-speed driven gear and integrally mounts a gear adapted to mesh with said output gear, said reverse rotation shaft being provided with a reverse clutch as a mechanical clutch to engage said reverse rotation shaft with or disengage it from said reverse gear.

* * * * *